Sept. 19, 1944. A. D. FALKOFF 2,358,696
CEMENTING COMPOSITIONS FOR OPTICAL ASSEMBLIES
Filed June 29, 1942
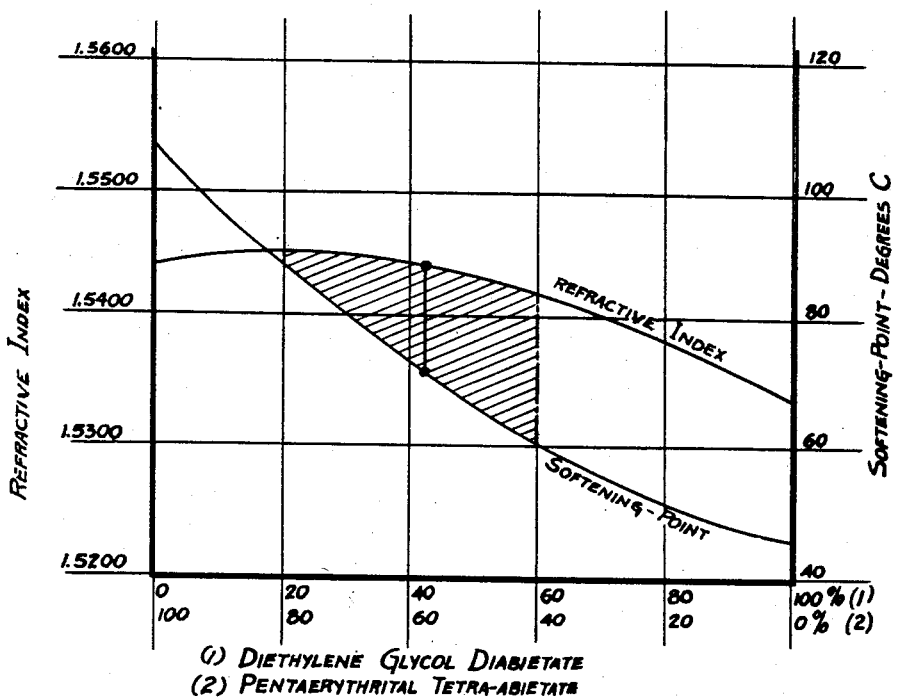
(1) DIETHYLENE GLYCOL DIABIETATE
(2) PENTAERYTHRITAL TETRA-ABIETATE Patented Sept. 19, 1944

2,358,696

UNITED STATES PATENT OFFICE 2,358,696

CEMENTING COMPOSITION FOR OPTICAL ASSEMBLIES

Adin Daniel Falkoff, Brooklyn, N. Y., assignor to Universal Camera Corporation, New York, N. Y., a corporation of New York Application June 29, 1942, Serial No. 449,031

5 Claims. (Cl. 88—1)

This invention relates to improvements in cementing compositions for use in optical assemblies wherein adhesive layers thereof are disposed between superimposed lenses or juxtaposed prisms forming, for example, objectives, eye-pieces, and the like.

Up to the present time, the industry has applied, as its cementing medium, a natural product, Canada balsam, which comprises an oleoresin incorporating abietic acid as its dominant component. Although this natural product possesses properties, when prepared, which provide optimum values for use as an adhesive bonding layer between optical elements having refractive indices ranging between 1.45 and 1.8 by virtue of its softening point of approximately 72° and an index of refraction of 1.543, considerable difficulty is entailed in preparing the same for use since the excess essential oils and the other volatile constituents normally present therein must be evaporated by cooking or distilling and no distinct method of measuring the end point in the distillation or cooking of such excess essential oils and other volatile matter has been ascertained either by temperature, color or viscosity observations; most of the present operations on this score having reliance on the "feel" of the operator. As a result of such condition, in many cases, where too little essential oils and volatile matter has been driven from the natural product, the end product cement becomes too soft, yields under stress at room temperatures, and has a tendency to flower; while in other cases, where too much of the essential oils and volatile matter have been driven off, the end product cement becomes brittle, discolored and resists the outward passage for discharge of air bubbles normally entrained in the composition as it hardens to form the cementing layer. Further, the natural Canada balsam has a high acid number and a high saponification number, with the result that the cement formed therefrom has poor resistance to the action of water, water vapor and alkalis, and a consequent low stability and resistance to weathering and aging, all of which, in connection with the fact that abietic acid, which is its chief constituent, has active tendency towards absorption of oxygen from the air, necessitates the application of a protective lacquer at the periphery of the cementing layer and the optical pieces connected thereby. In addition to the above, even if the natural Canada balsam were cooked or distilled under the most optimum "practical experience" conditions, there always are additional intangible factors, normally difficult to compensate, which must be taken into consideration, namely, that its properties are dependent upon the tree from which it was obtained, the climatic conditions of the particular location of the tree, and the season of tapping.

The cementing composition, according to my invention, comprises chemically and physically stable synthetic esters of abietic acid, or mixtures of compatible esters of abietic acid, having refractive indices between 1.5 and 1.6 below the softening point thereof.

Generally, I have found that both diethylene glycol diabietate and pentaerythritol tetraabietate, or a mixture of these esters, which, synthesized by treatment of rosin in methods well known in the art, have the property, independently, and by virtue of their compatibility when intermixed in a range of 20% to 60% of diethylene glycol di-abietate and 80% to 40% of pentaerythritol tetra-abietate, to form optical cements of softening point and refractive index within the range of the desired optimum values thereof required for use at ordinary temperatures with standard optical assemblies of the character specified and, specifically, a mixture of 42% diethylene glycol di-abietate and 58% pentaerythritol tetra-abietate, produces substantially identical properties of the most satisfactorily treated natural Canada balsam, namely, a softening point of 71.5° C. and a refractive index of 1.543.

I have found that each of these esters, diethylene glycol di-abietate and pentaerythritol tetra-abietate, not only have extremely low acid and saponification numbers individually and collectively, in comparison with the natural Canadian balsam, and are thereby highly resistant to the film degrading effect developed in natural balsam cement by water, water vapor, alkali or oxygen of the air, but also, being synthetics of substantially pure composition, have no volatile constituents as are present in the natural balsam, and therefore, have a low shrinkage on cooling and solidification, thus providing a greater resistance to shock and increased stability at low temperature.

Although my preferred cementing composition is a mixture of 42% diethylene glycol di-abietate and 58% pentaerythritol tetra-abietate, I have found, by experiments between the range of 100% of diethylene glycol di-abietate and 100% of pentaerythritol tetra-abietate, that the preferred composition percentages, for normal climatic conditions, lie in the hatched area of the graph in the drawing herein, namely between 20% diethylene glycol di-abietate—80% pentaerythritol tetra-abietate and 60% diethylene glycol di-abietate—40% pentaerythritol tetra-abietate. In the graph, the abscissa represents, respectively, percentages of diethylene glycol di-abietate and pentaerythritol tetra-abietate, while the ordinates represent, respectively, index of refraction and softening point of the individual esters and their proportional mixtures.

Following is a comparison between natural Canadian balsam and my preferred composition of 42% diethylene glycol di-abietate and 58% pentaerythritol tetra-abietate, both as to properties and as to side-by-side tests when applied as an adhesive layer between superimposed optical lenses:

A. As to properties

| Property | Natural Canada balsam distilled | Diethylene glycol di-abietate and pentaerythritol tetra-abietate mixture |
| --- | --- | --- |
| Color | Colorless | Colorless. |
| Softening point | 72C | 71.5C. |
| Index of refraction ($n_D$) | 1.543 | 1.544. |
| Acid number | About 150 | About 15. |
| Saponification number | High | About 30. |
| Chemical stability | Inferior | Superior. |
| Solubility in ordinary organic solvents | Good | Good. |
| Uniformity | Questionable | Do. |
| Shrinkage on cooling | Greater | Less. |

B. As to side-by-side tests

| Procedure with superimposed optical lenses | Natural Canada balsam bonding layer | Mixture of diethylene glycol di-abietate and pentaerythritol tetra-abietate bonding layer |
| --- | --- | --- |
| Fourteen were maintained at room conditions for three days. | 8 developed bubbles, 6 did not change. | 14 did not change. |
| Three were maintained at 120° F. for 48 hours. | 2 developed bubbles, 1 did not change. | 3 did not change. |
| Three were brought rapidly to a temperature of about 100° F. | 3 cracked badly | 3 remained good. |

Although I have found that, for normal climatic conditions, my preferred composition is that one incorporating the mixtures of diethylene glycol di-abietate and pentaerythritol tetra-abietate within the ranges above defined, and specifically the mixture of 42% diethylene glycol di-abietate and 58% pentaerythritol tetra-abietate, I have found that the individual esters, namely diethylene glycol di-abietate and pentaerythritol tetra-abietate, respectively, have specific advantages, when used alone, for unusual climatic conditions, namely, that diethylene glycol di-abietate is of considerable advantage for use in cold to frigid climates by virtue of its low softening point, while pentaerythritol tetra-abietate is advantageous in warm to hot climates, by virtue of its high softening point.

Various changes and modifications may be made to the scope of application of the invention without departing from the broader spirit and scope thereof, as set forth in the following claims.

I claim:

1. As a new article of manufacture, an adhesive composition for application between superimposed or juxtaposed optical elements to form therebetween a bonding layer having a refractive index within the range of optical elements, comprising a synthetic resin incorporating a mixture of from 20 to 60 parts of diethylene glycol di-abietate with 80 to 40 parts of pentaerythritol tetra-abietate.

2. As a new article of manufacture, an adhesive composition for application between superimposed or juxtaposed optical elements to form therebetween a bonding layer having a refractive index within the range of optical elements, comprising a synthetic resin incorporating a mixture of 42 parts of diethylene glycol di-abietate and 58 parts of pentaerythritol tetra-abietate, said mixture having a softening point of 71.5° C. and a refraction index of 1.544.

3. As a new article of manufacture, a synthetic resin composition for forming bonding layers between superimposed or juxtaposed optical elements, comprising homogeneous mixtures of diethylene glycol di-abietate and pentaerythritol tetra-abietate in such varying proportions to provide bonding layers having refractive indices within the range of 1.534 and 1.545.

4. As a new article of manufacture, superimposed or juxtaposed optical elements having refractive indices within the range of 1.45 and 1.8 bonded together by means of a layer of a synthetic resin consisting of a homogeneous mixture of esters of abietic acid and having a refractive index within the range of 1.5 and 1.6.

5. As a new article of manufacture, superimposed or juxtaposed optical elements having refractive indices within the range of 1.45 and 1.8 bonded together by means of a layer of a synthetic resin consisting of a homogeneous mixture of diethylene glycol di-abietate and pentaerythritol tetra-abietate and having a refractive index within the range of 1.5 and 1.6.

ADIN DANIEL FALKOFF.